United States Patent
Liu et al.

(10) Patent No.: US 8,289,611 B2
(45) Date of Patent: Oct. 16, 2012

(54) THERMOCHROMATIC DEVICE AND THERMOCHROMATIC DISPLAY APPARATUS

(75) Inventors: Peng Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 276 days.

(21) Appl. No.: 12/884,627

(22) Filed: Sep. 17, 2010

(65) Prior Publication Data

US 2011/0149371 A1    Jun. 23, 2011

(30) Foreign Application Priority Data

Dec. 18, 2009    (CN) .......................... 2009 1 0189145

(51) Int. Cl.
  *G02F 1/01*    (2006.01)
(52) U.S. Cl. ........................................ 359/288; 359/265
(58) Field of Classification Search .................... 359/288
  See application file for complete search history.

(56) References Cited

U.S. PATENT DOCUMENTS

| | | | |
|---|---|---|---|
| 2008/0170982 A1 | 7/2008 | Zhang et al. | |
| 2009/0323475 A1 | 12/2009 | Jiang et al. | |
| 2010/0126985 A1 | 5/2010 | Feng et al. | |
| 2011/0157672 A1* | 6/2011 | Liu et al. | ........................ 359/267 |

FOREIGN PATENT DOCUMENTS

| | | |
|---|---|---|
| CN | 101437663 | 5/2009 |
| CN | 101605409 | 12/2009 |
| JP | 2009-296591 | 12/2009 |
| KR | 20080070204 | 7/2008 |

* cited by examiner

*Primary Examiner* — James Jones
(74) *Attorney, Agent, or Firm* — Altis Law Group, Inc.

(57) ABSTRACT

A thermochromatic device includes an insulating substrate, a color element, a heating element, a first electrode, and a second electrode. The color element is located on the insulating substrate and includes a color-changeable material. A phase of the color-changeable material is changeable between a crystalline state and an amorphous state. A temperature phase change of the color-changeable material is above 40° C. A first reflectivity of the color-changeable material at the crystalline state and a second reflectivity of the color-changeable material the amorphous state are different. The heating element is located adjacent to the color element and includes a carbon nanotube structure. The first electrode and the second electrode are electrically connected to the heating element. A thermochromatic display apparatus using the thermochromatic device is also related.

20 Claims, 12 Drawing Sheets

THERMOCHROMATIC DEVICE AND THERMOCHROMATIC DISPLAY APPARATUS

CROSS-REFERENCE TO RELATED APPLICATIONS

This application claims all benefits accruing under 35 U.S.C. §119 from China Patent Application No. 200910189145.X, filed on Dec. 18, 2009 in the China Intellectual Property Office, disclosure of which is incorporated herein by reference. This application is related to applications entitled, "THERMOCHROMATIC DEVICE AND THERMOCHROMATIC DISPLAY APPARATUS", filed Sep. 17, 2010 (Ser. No. 12/884,641); and "THERMOCHROMATIC DEVICE AND THERMOCHROMATIC DISPLAY APPARATUS", filed Sep. 17, 2010 (Ser. No. 12/884,651).

BACKGROUND

1. Technical Field

The present disclosure relates to a thermochromatic device and thermochromatic display apparatus using the same.

2. Description of Related Art

Thermochromatic materials are materials that can change their color in response to changes in temperature. Thermochromatic materials can be used to make a thermochromatic device.

A thermochromatic device, according to the prior art usually includes a support substrate, a thermochromatic material layer located on a surface of the support substrate, and a heater. The heater is used to heat the thermochromatic material layer. The heater is usually made of ceramics, conductive glasses or metals. However, a color change speed of the thermochromatic device is slow because of the relatively high heat capacity per unit and slow heating speed of the heater.

What is needed, therefore, is to provide a thermochromatic device having an improved color change speed and thermochromatic display apparatus using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present thermochromatic device and thermochromatic display apparatus using the same.

Figure 1:
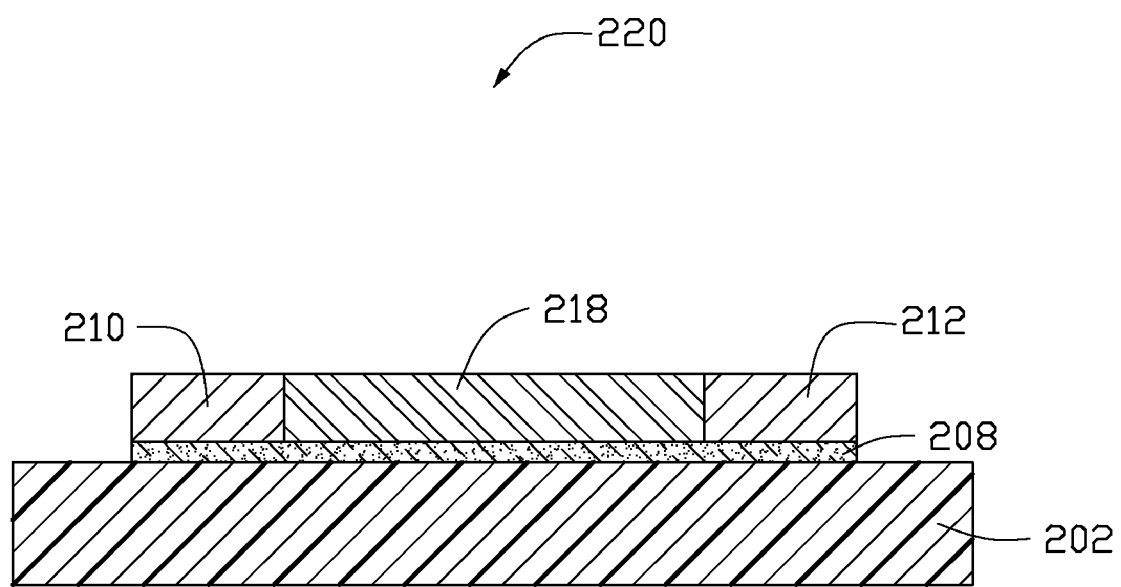
FIG. 1 is a schematic view of one embodiment of a thermochromatic device.

Referring to FIG. 1, a thermochromatic device 220 of one embodiment includes an insulating substrate 202, a color element 218, a heating element 208, a first electrode 210, and a second electrode 212.

The insulating substrate 202 has a surface (not labeled). The color element 218, the heating element 208, the first electrode 210, and the second electrode 212 are located on the surface of the insulating substrate 202. The heating element 208 is located adjacent to the color element 218 and configured to heat the color element 218. The heating element 208 can be located substantially adjacent to, about, above, on, or under the color element 218. Any arrangement can be made just as long as the heating element 208 can heat the color element 218. The first electrode 210 and the second electrode 212 are located apart from each other and electrically connected to the heating element 208.

In one embodiment, both the heating element 208 and the color element 218 are layered structures. The heating element 208 is located on the surface of the insulating substrate 202. The first electrode 210 and the second electrode 212 are located respectively on a surface of the heating element 208 and at the two opposite sides of the heating element 208. The color element 218 is located on a surface of the heating element 208 and between the first electrode 210 and the second electrode 212.

The insulating substrate 202 may be made of rigid material or flexible material. The rigid material may be ceramic, glass, quartz, resin, silicon, silicon dioxide, diamond, or alumina. The flexible material may be flexible polymer, fiber, or synthetic paper. The flexible polymer can be polyethylene terephthalate (PET), polycarbonate (PC), polyethylene (PE), or polyimide (PI). When the insulating substrate 202 is made of flexible material, the thermochromatic device 220 can be folded into random shapes during use. The melting point of the insulating substrate 202 is equal to or higher than 200° C. A size and a thickness of the insulating substrate 202 can be chosen according to need. In one embodiment, the insulating substrate 202 is a PET film with a thickness of about 1 millimeter.

The color element 218 is made of color-changeable material. The color-changeable material can perform a transformation between the crystalline and amorphous at a temperature phase change when a heat write pulse or a heat erase pulse is supplied. The heat write pulse allow the thermochromatic device 220 to display. The heat erase pulse can erase the display. When the thermochromatic device 220 needs to display, a short and intensive heat write pulse can be supplied to heat the color element 218. Because the heating temperature of the heat write pulse is very high, the color element 218 is heated to a liquid state instantly. Because the heating time of the heat write pulse is very short, the temperature of the color element 218 decreases instantly and the liquid state color element 218 becomes an amorphous solid state. The color-changeable material of the color element 218 can remain in an amorphous state, at a room temperature, without any outside energy. Because the reflectivity of the crystalline color-changeable material and the amorphous color-changeable material of the color element 218 is different, the color element 218 can show different brightness and the thermochromatic device 220 can display. In one embodiment, the brightness can be discriminated by the eye so that the thermochromatic device 220 can be used to display a visual spot. When the thermochromatic device 220 needs to erase the display, a long and weak heat erase pulse can be supplied to heat the color element 218. The process is an annealing process. After annealing, the color-changeable material of the color element 218 is changed to the original crystalline state from amorphous state, and the display is erased. The color-changeable material of the color element 218 can remain in a crystalline state, at a room temperature, without any outside energy. Because of this, the display of the thermochromatic device 220 can remain, where a bistable display can be performed. The bistable display means that a display does not require any outside energy to maintain a display state or a non-display state.

In one embodiment, the temperature phase change at which the color-changeable material of the color element 218 can perform a transformation between the crystalline and amorphous is in a range from about 40° C. to about 600° C.

The color-changeable material, having a temperature phase change above 40° C. allows the thermochromatic device 220 to work at room temperature. The color-changeable material having a temperature phase change below 600° C. allows the thermochromatic device 220 have a low working voltage. In addition, the color-changeable material having a temperature phase change below 600° C. allows the heating element 208 of the carbon nanotube to not be oxidized and to have a long lifespan. The phase change time for the color-changeable material to perform a transformation between the crystalline and amorphous can be as short as possible so that the thermochromatic device 220 has a fast response speed. In one embodiment, the phase change time is shorter than 40 milliseconds.

The color-changeable material can be chalcogenide compound such as sulfur-based compound, tellurium-based compound, selenium-based compound, or tellurium-selenium-based compound. The sulfur-based compound can be germanium-sulfur, arsenic-sulfur, or indium-sulfur. The tellurium-based compound can be germanium-tellurium, arsenic-tellurium, antimony-tellurium, or indium-tellurium. The selenium-based compound can be germanium-selenium, arsenic-selenium, antimony-selenium, or indium-selenium. Furthermore, the color-changeable material can include additives to improve the phase changing speed. The additive can be copper, silver, gold, palladium, nickel, cobalt, or combinations thereof. The phase change time of the chalcogenide compound from crystalline to amorphous is in a range from about several nanoseconds to about hundreds of nanoseconds. The phase change time of the chalcogenide compound from amorphous to crystalline is in a range from about 0.5 microseconds to about 1 millisecond. In addition, other crystalline materials such as semiconductors, semiconductor compounds, metal compounds, or polymers having a temperature phase change above 40° C., will make the phase change time shorter than 40 milliseconds, and different reflectivity at crystalline state and amorphous state can be used to make the color element 218.

In one embodiment, the color element 218 is a layer of germanium-selenium compound with a thickness from about 10 micrometers to about 500 micrometers. In other embodiments, the color element 218 is a layer of germanium-selenium compound with a thickness from about 50 micrometers to about 100 micrometers. The color element 218 can be formed by sputtering or thermal deposition. The color element 218 is located between the first electrode 210 and the second electrode 212. The color element 218 can be spaced from the first electrode 210 and the second electrode 212 or make contact with the first electrode 210 and the second electrode 212.

The heating element 208 includes a carbon nanotube structure. The carbon nanotube structure includes a plurality of carbon nanotubes uniformly distributed therein, and the carbon nanotubes therein can be combined by van der Waals attractive force therebetween. The carbon nanotube structure can be a substantially pure structure of the carbon nanotubes, with few impurities. The carbon nanotubes can be used to form many different structures and provide a large specific surface area. The heat capacity per unit area of the carbon nanotube structure can be less than $2 \times 10^{-4}$ J/m$^2$·K. In one embodiment, the heat capacity per unit area of the carbon nanotube structure is less than $1.7 \times 10^{-6}$ J/m$^2$·K. As the heat capacity of the carbon nanotube structure is very low, and the temperature of the heating element 208 can rise and fall quickly, which makes the heating element 208 have a high heating efficiency and accuracy. As the carbon nanotube structure can be substantially pure, the carbon nanotubes are not easily oxidized and the life of the heating element 208 will be relatively long. Further, the carbon nanotubes have a low density, about 1.35 g/cm$^3$, so the heating element 208 is light. As the heat capacity of the carbon nanotube structure is very low, the heating element 208 has a high response heating speed. As the carbon nanotube has large specific surface area, the carbon nanotube structure with a plurality of carbon nanotubes has large specific surface area. When the specific surface of the carbon nanotube structure is large enough, the carbon nanotube structure is adhesive and can be directly applied to a surface.

The carbon nanotubes in the carbon nanotube structure can be arranged orderly or disorderly. The term 'disordered carbon nanotube structure' includes, but is not limited to, to a structure where the carbon nanotubes are arranged along many different directions, and the aligning directions of the carbon nanotubes are random. The number of the carbon nanotubes arranged along each different direction can be almost the same (e.g. uniformly disordered). The disordered carbon nanotube structure can be isotropic. The carbon nanotubes in the disordered carbon nanotube structure can be entangled with each other.

The carbon nanotube structure including ordered carbon nanotubes is an ordered carbon nanotube structure. The term 'ordered carbon nanotube structure' includes, but is not limited to, to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube structure can be single-walled, double-walled, or multi-walled carbon nanotubes.

The carbon nanotube structure can be a carbon nanotube film structure with a thickness ranging from about 0.5 nanometers to about 1 millimeter. The carbon nanotube film structure can include at least one carbon nanotube film. The carbon nanotube structure can also be a linear carbon nanotube structure with a diameter ranging from about 0.5 nanometers to about 1 millimeter. The carbon nanotube structure can also be a combination of the carbon nanotube film structure and the linear carbon nanotube structure. It is understood that any carbon nanotube structure described can be used with all embodiments. It is also understood that any carbon nanotube structure may or may not employ the use of a support structure.

When the heating element 208 is a carbon nanotube film structure, the carbon nanotube film structure can be located on the surface of the insulating substrate 202 or the surface of the color element 218. When the heating element 208 is a linear carbon nanotube structure, the linear carbon nanotube structure can be located around the color element 218.

Figure 2:
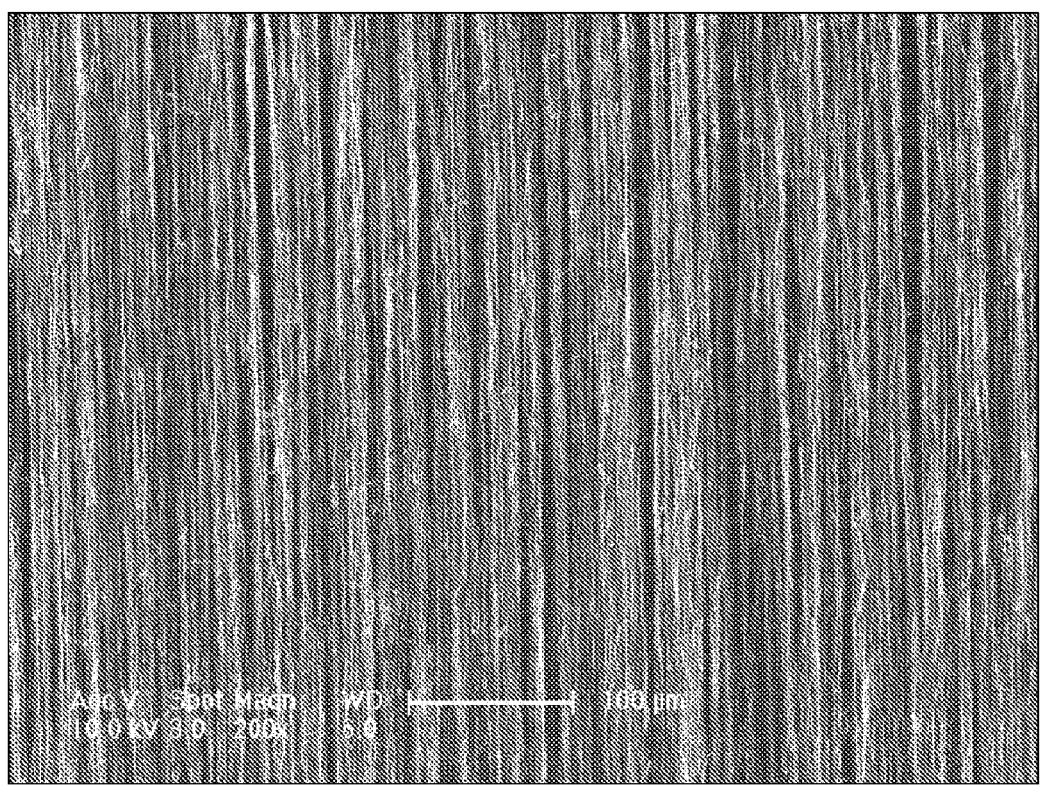
FIG. 2 is a Scanning Electron Microscope (SEM) image of a drawn carbon nanotube film.
Figure 3:
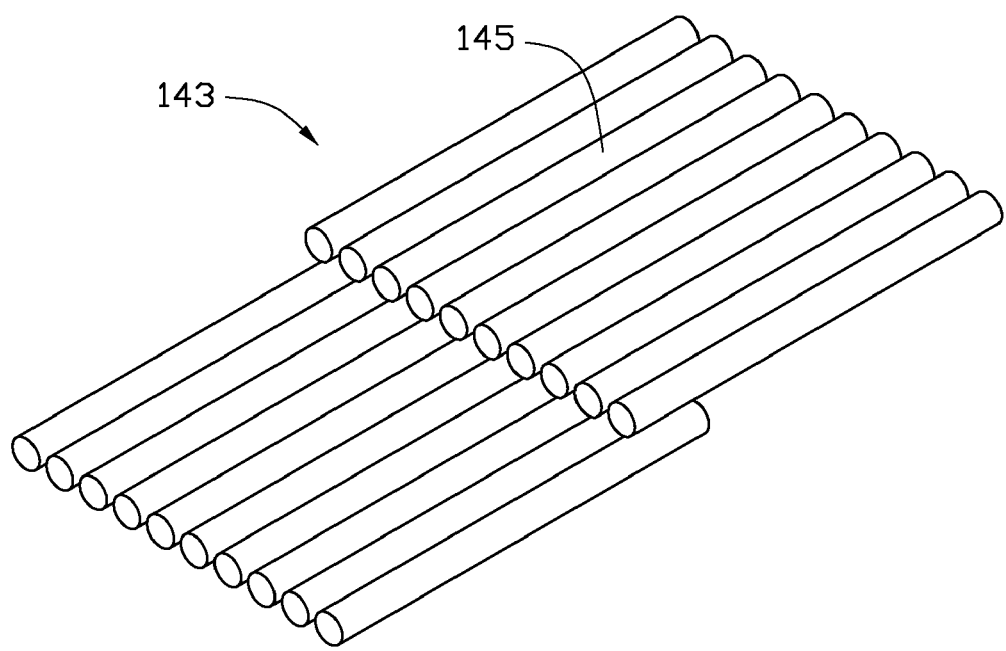
FIG. 3 is a schematic of a carbon nanotube segment.

In one embodiment, the carbon nanotube film structure includes at least one drawn carbon nanotube film. A drawn carbon nanotube film can be drawn from a carbon nanotube array that is able to have a film drawn therefrom. The drawn carbon nanotube film includes a plurality of successive and oriented carbon nanotubes joined end-to-end by van der Waals attractive force therebetween. The drawn carbon nanotube film is a free-standing film. Referring to FIGS. 2 to 3, each drawn carbon nanotube film includes a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. As can be seen in FIG. 2, some variations can occur in the drawn carbon nanotube film. The carbon nanotubes 145 in the drawn carbon nanotube film are oriented along a preferred orientation. The carbon nanotube film can be treated with an organic solvent to increase the mechanical strength and toughness and reduce the coefficient of friction of the carbon nanotube film. A thickness of the carbon nanotube film can range from about 0.5 nanometers to about 100 micrometers. In one embodiment, the heating element 208 is a single drawn carbon nanotube film with a length of 300 micrometers and a width of 100 micrometers. The carbon nanotubes of the heating element 208 extend from the first electrode 210 to the second electrode 212. The drawn carbon nanotube film can be attached to surfaces of the insulating substrate 202 with an adhesive, by mechanical force, by the adhesive properties of the carbon nanotube film, or by a combination thereof. The response speed of the drawn carbon nanotube film is very high because of the very low heat capacity per unit area, the large surface area, and the large radiation coefficient. The temperature of the single drawn carbon nanotube film with a length of 300 micrometers and a width of 100 micrometers can be risen to 2000 Kelvin in 1 millisecond.

The carbon nanotube film structure of the heating element 208 can include at least two stacked drawn carbon nanotube films. In other embodiments, the carbon nanotube structure can include two or more coplanar carbon nanotube films, and can include layers of coplanar carbon nanotube films. Additionally, when the carbon nanotubes in the carbon nanotube film are aligned along one preferred orientation (e.g., the drawn carbon nanotube film), an angle can exist between the orientation of carbon nanotubes in adjacent films, whether stacked or adjacent. Adjacent carbon nanotube films can be combined by only the van der Waals attractive force therebetween. The number of the layers of the carbon nanotube films is not limited as long as the carbon nanotube structure. However the thicker the carbon nanotube structure, the specific surface area will decrease. An angle between the aligned directions of the carbon nanotubes in two adjacent carbon nanotube films can range from about 0 degrees to about 90 degrees. When the angle between the aligned directions of the carbon nanotubes in adjacent stacked carbon nanotube films is larger than 0 degrees, a microporous structure is defined by the carbon nanotubes in the heating element 208. The carbon nanotube structure in an embodiment employing these films will have a plurality of micropores. Stacking the carbon nanotube films will also add to the structural integrity of the carbon nanotube structure. In some embodiments, the carbon nanotube structure is a free standing structure.

In another embodiment, the carbon nanotube film structure includes a flocculated carbon nanotube film. The flocculated carbon nanotube film can include a plurality of long, curved, disordered carbon nanotubes entangled with each other. Further, the flocculated carbon nanotube film can be isotropic. The carbon nanotubes can be substantially uniformly dispersed in the carbon nanotube film. Adjacent carbon nanotubes are acted upon by van der Waals attractive force to form an entangled structure with micropores defined therein. It is understood that the flocculated carbon nanotube film is very porous. Sizes of the micropores can be less than 10 micrometers. The porous nature of the flocculated carbon nanotube film will increase specific surface area of the carbon nanotube structure. Further, due to the carbon nanotubes in the carbon nanotube structure being entangled with each other, the carbon nanotube structure employing the flocculated carbon nanotube film has excellent durability, and can be fashioned into desired shapes with a low risk to the integrity of the carbon nanotube structure. The flocculated carbon nanotube film, in some embodiments, is free standing due to the carbon nanotubes being entangled and adhered together by van der Waals attractive force therebetween. The thickness of the flocculated carbon nanotube film can range from about 0.5 nanometers to about 1 millimeter.

In another embodiment, the carbon nanotube film structure can include at least a pressed carbon nanotube film. The pressed carbon nanotube film can be a free-standing carbon nanotube film. The carbon nanotubes in the pressed carbon nanotube film are arranged along a same direction or arranged along different directions. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is 0 degrees to approximately 15 degrees. The greater the pressure applied, the smaller the angle formed. When the carbon nanotubes in the pressed carbon nanotube film are arranged along different directions, the carbon nanotube structure can be isotropic. The thickness of the pressed carbon nanotube film ranges from about 0.5 nanometers to about 1 millimeter.

Carbon nanotube structures include linear carbon nanotubes. In other embodiments, the linear carbon nanotube structures, including carbon nanotube wires and/or carbon nanotube cables, can be used.

Figure 4:
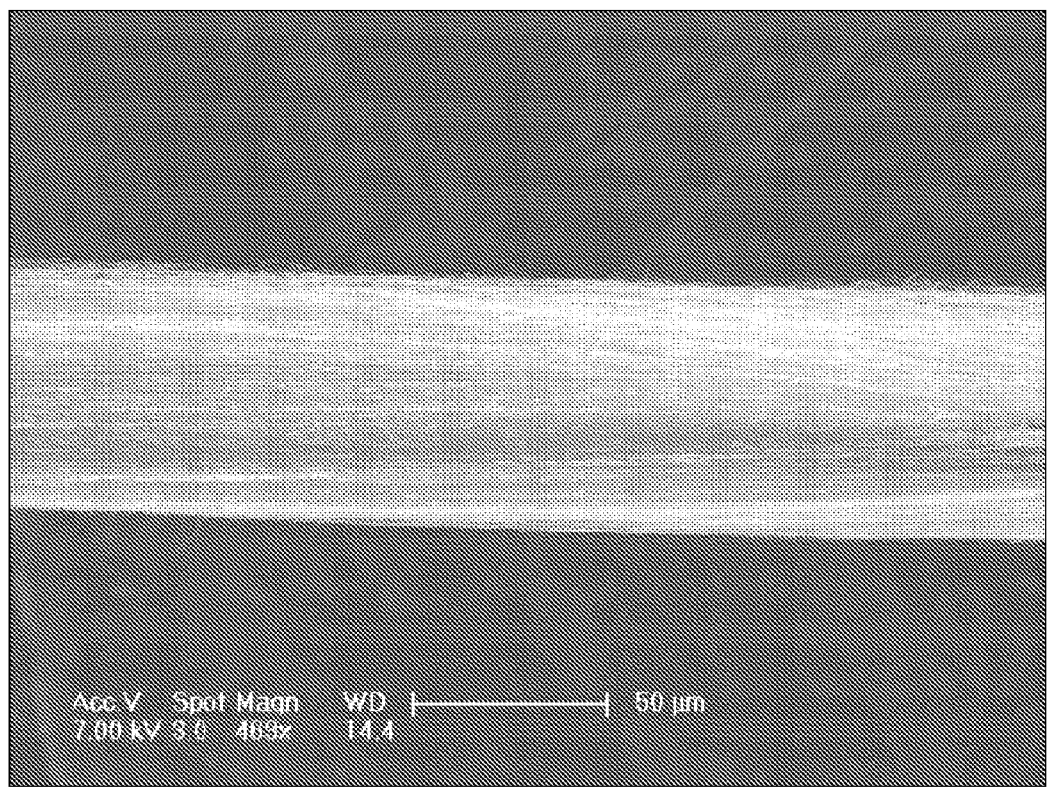
FIG. 4 is an SEM image of an untwisted carbon nanotube wire.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into untwisted carbon nanotube wire. Referring to FIG. 4, the untwisted carbon nanotube wire includes a plurality of carbon nanotubes substantially oriented along a same direction (i.e., a direction along the length of the untwisted carbon nanotube wire). The carbon nanotubes are parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 0.5 nanometers to about 100 micrometers.

Figure 5:
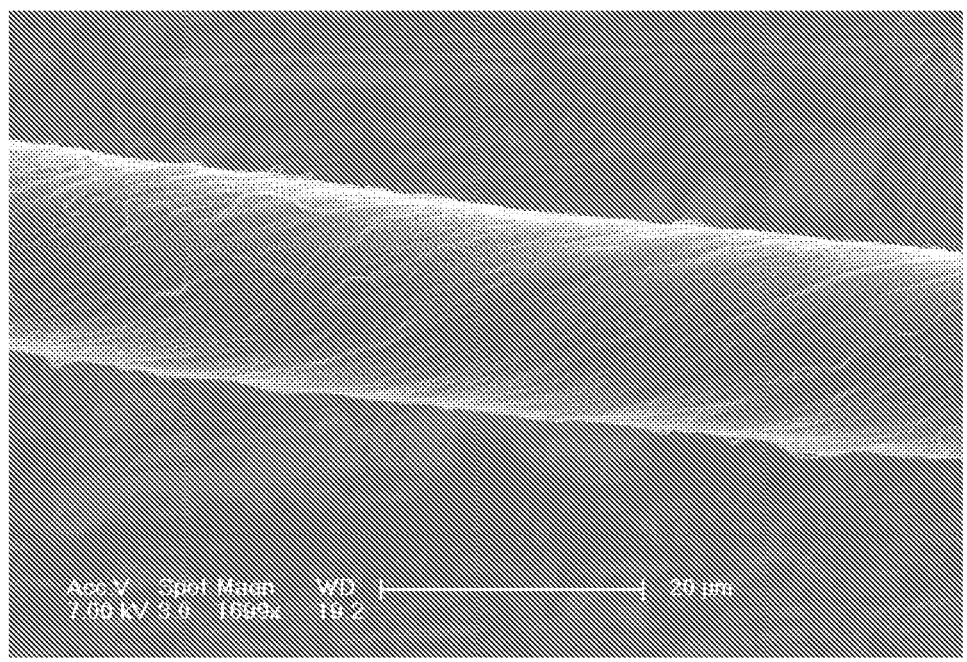
FIG. 5 is an SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 5, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. Length of the carbon nanotube wire can be set as desired. A diameter of the twisted carbon nanotube wire can be from about 0.5 nanometers to about 100 micrometers. Further, the twisted carbon nanotube wire can be treated with a volatile organic solvent after being twisted. After being soaked by the organic solvent, the adjacent paralleled carbon nanotubes in the twisted carbon nanotube wire will bundle together, due to the surface tension of the organic solvent when the organic solvent volatilizing. The specific surface area of the twisted carbon nanotube wire will decrease, while the density and strength of the twisted carbon nanotube wire will be increased.

The carbon nanotube cable includes two or more carbon nanotube wires. The carbon nanotube wires in the carbon nanotube cable can be, twisted or untwisted. In an untwisted carbon nanotube cable, the carbon nanotube wires are parallel with each other. In a twisted carbon nanotube cable, the carbon nanotube wires are twisted with each other.

The heating element 208 can include one or more linear carbon nanotube structures. The plurality of linear carbon nanotube structures can be paralleled with each other, cross with each other, weaved together, or twisted with each other. The resulting structure can be a planar structure if so desired.

In other embodiments, the carbon nanotube structure can be a carbon nanotube layer formed by printing. The carbon nanotube layer includes a plurality of carbon nanotubes disorderly distributed therein.

In other embodiments, the carbon nanotube structure can include other materials thus becoming carbon nanotube composite. The carbon nanotube composite can include a carbon nanotube structure and a plurality of fillers dispersed therein. The filler can be comprised of metal, ceramic, glass, carbon fiber or combinations thereof. Alternatively, the carbon nanotube composite can include a matrix and a plurality of carbon nanotubes dispersed therein. The matrix can be comprised of resin, metal, ceramic, glass, carbon fiber or combinations thereof. In one embodiment, a carbon nanotube structure is packaged in a resin matrix.

The first electrode 210 and the second electrode 212 can be located on the surface of the insulating substrate 202, on the surface of the color element 218, or on the surface of the heating element 208. The first electrode 210 and the second electrode 212 can be made of conductive material such as carbon nanotube, metal, alloy, indium tin oxides (ITO), antimony doped Tin oxide (ATO), conductive polymer, or a conductive slurry. In one embodiment, the first electrode 210 and the second electrode 212 are formed on the surface of the heating element 208 by a printing process. The conductive slurry is composed of metal powder, glass powder, and binder. The metal powder can be silver powder, the glass powder has low melting point, and the binder can be terpineol or ethyl cellulose (EC). The conductive slurry can include from about 50% to about 90% (by weight) of the metal powder, from about 2% to about 10% (by weight) of the glass powder, and from about 8% to about 40% (by weight) of the binder.

Thermochromatic device 220 can be made by the following steps:

(a) laying a single drawn carbon nanotube film on a surface of the insulating substrate 202 as a heating element 208;

(b) forming a first electrode 210 and a second electrode 212 on the surface of the heating element 208; and (c) depositing a layer of germanium-selenium compound between the first electrode 210 and the second electrode 212 as a color element 218.

During operation, a pulse voltage is supplied to the first electrode 210 and the second electrode 212. The temperature of the heating element 208 raises and a heat pulse is supplied to the color element 218 from the heating element 208. When the pulse voltage is short and high, a short and intensive heat write pulse can be supplied by the heating element 208. When the pulse voltage is long and low, a long and weak heat erase pulse can be supplied by the heating element 208. When the thermochromatic device 220 needs to display, a short and intensive heat write pulse can be supplied to the color element 218. For example, the temperature of the heat write pulse is in a range from about 900° C. to about 1000° C. and the cycle of the heat write pulse is in a range from about 50 nanoseconds to about 200 nanoseconds. Because the heating temperature of the heat write pulse is very high, the color element 218 is heated to a liquid state instantly. Because the heating time of the heat write pulse is very short, the temperature of the color element 218 decreases instantly and the liquid state color element 218 becomes an amorphous solid state. Because the reflectivity of the amorphous color-changeable material is different from the original crystalline color-changeable material, the color element 218 can show different brightness and the thermochromatic device 220 can display. The color-changeable material can keep in amorphous state, at room temperature, without any outside energy. When the thermochromatic device 220 needs to erase the display, a long and weak heat erase pulse can be supplied to heat the color element 218. For example, the temperature of the heat write pulse is in a range from about 500° C. to about 600° C. and the cycle of the heat write pulse is in a range from about 1 microsecond to about 1 millisecond. The process is an annealing process. After annealing the color-changeable material, it changes to the original crystalline state from the amorphous state, and the display is erased. The color-changeable material can keep in crystalline state, at room temperature, without any outside energy.

Because of this, the display of the thermochromatic device 220 can remain, where a bistable display can be performed. The bistable display means that the energy is only consumed during the process of writing and erasing, and there is no energy consumption after the process of writing and erasing. Thus, the thermochromatic device 220 can save energy.

Figure 6:
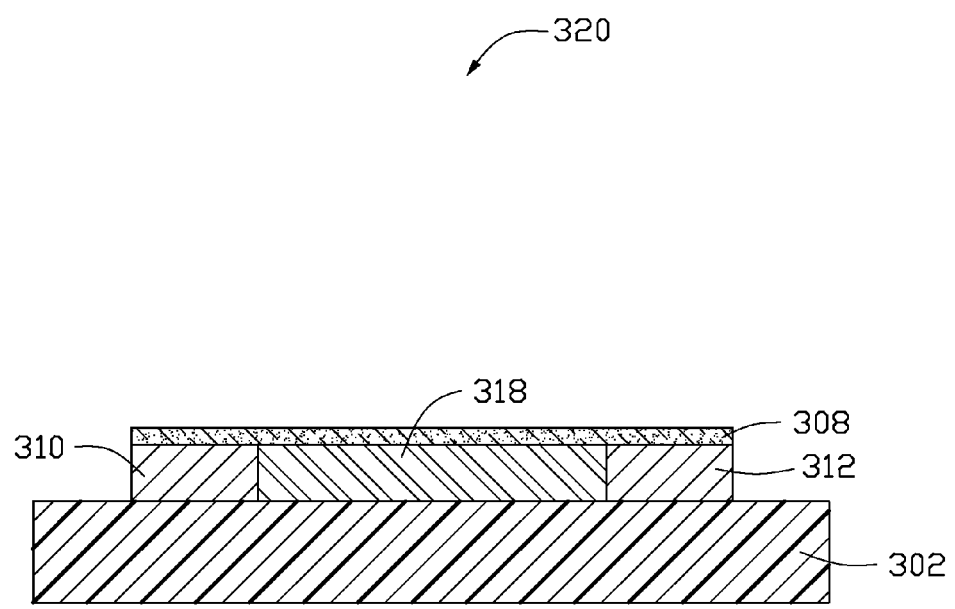
FIG. 6 is a schematic view of one embodiment of a thermochromatic device.

Referring to FIG. 6, a thermochromatic device 320 of one embodiment includes an insulating substrate 302, a color element 318, a heating element 308, a first electrode 310, and a second electrode 312. The thermochromatic device 320 is similar to the thermochromatic device 220 described above except that the color element 318 is located between the insulating substrate 302 and the heating element 308. In one embodiment, both the heating element 308 and the color element 318 are layered structures. The first electrode 310 and the second electrode 312 are located on a surface of the insulating substrate 302 and spaced from each other. The color element 318 is located on the surface of the insulating substrate 302 and between the first electrode 310 and the second electrode 312. The heating element 308 is located on a surface of the color element 318 and covers the color element 318, the first electrode 310, and the second electrode 312. The heating element 308 is a single drawn carbon nanotube film, which is transparent.

Thermochromatic device 320 can be made by the following steps:

(d) forming a first electrode 310 and a second electrode 312 on the surface of the insulating substrate 302;

(e) depositing a layer of germanium-selenium compound between the first electrode 310 and the second electrode 312 as a color element 318; and (f) placing a single drawn carbon nanotube film on a surface of the color element 318 to cover the color element 318, the first electrode 310 and the second electrode 312.

Figure 7:
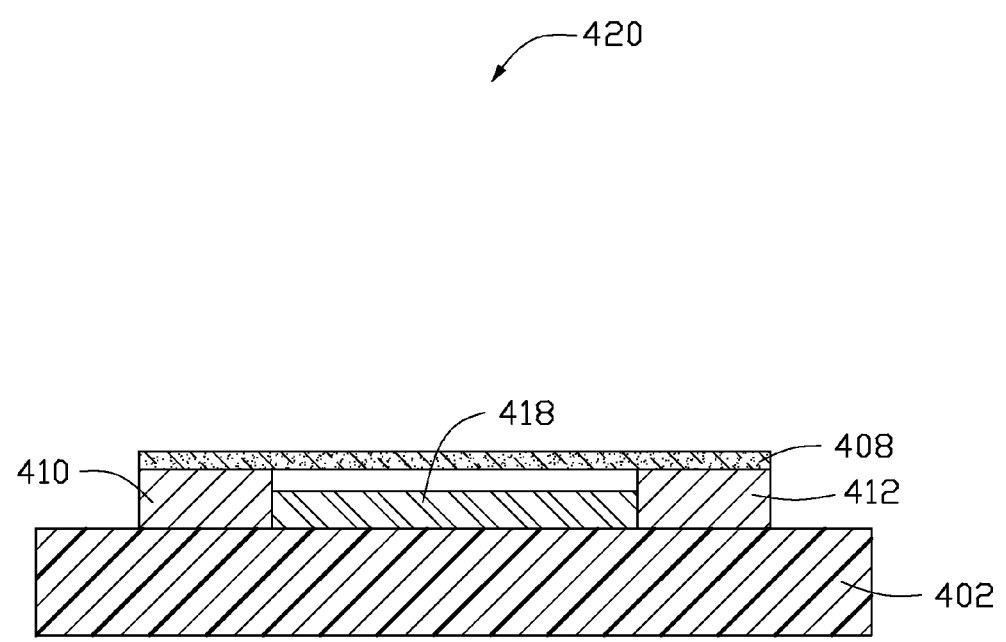
FIG. 7 is a schematic view of one embodiment of a thermochromatic device.

Referring to FIG. 7, a thermochromatic device 420 of one embodiment includes an insulating substrate 402, a color element 418, a heating element 408, a first electrode 410, and a second electrode 412. The thermochromatic device 420 is similar to the thermochromatic device 320 described above except that the heating element 408 is spaced from the color element 418. In one embodiment, both the heating element 408 and the color element 418 are layered structures. The first electrode 410 and the second electrode 412 are located on a surface of the insulating substrate 402 and spaced from each other. The color element 418 is located on the surface of the insulating substrate 402 and between the first electrode 410 and the second electrode 412. The color element 418 is thinner than the electrodes 410 and 412. The heating element 408 is located on a surface of the first electrode 410 and the second electrode 412 and spaced from the color element 418. The heating element 408 is a single drawn carbon nanotube film, which is a transparent and free standing. The heat capacity per unit area of the single drawn carbon nanotube film is less than $1.7 \times 10^{-6}$ J/m²·K. The main heat exchange manner between the color element 418 and the heating element 408 is heat radiation. Because the single drawn carbon nanotube film has small heat capacity per unit area, the heating element 408 can be heated to a high temperature in short time and supply a short and intensive heat write pulse to the color element 418. Therefore, the thermochromatic device 420 has an improved response speed.

Figure 8:
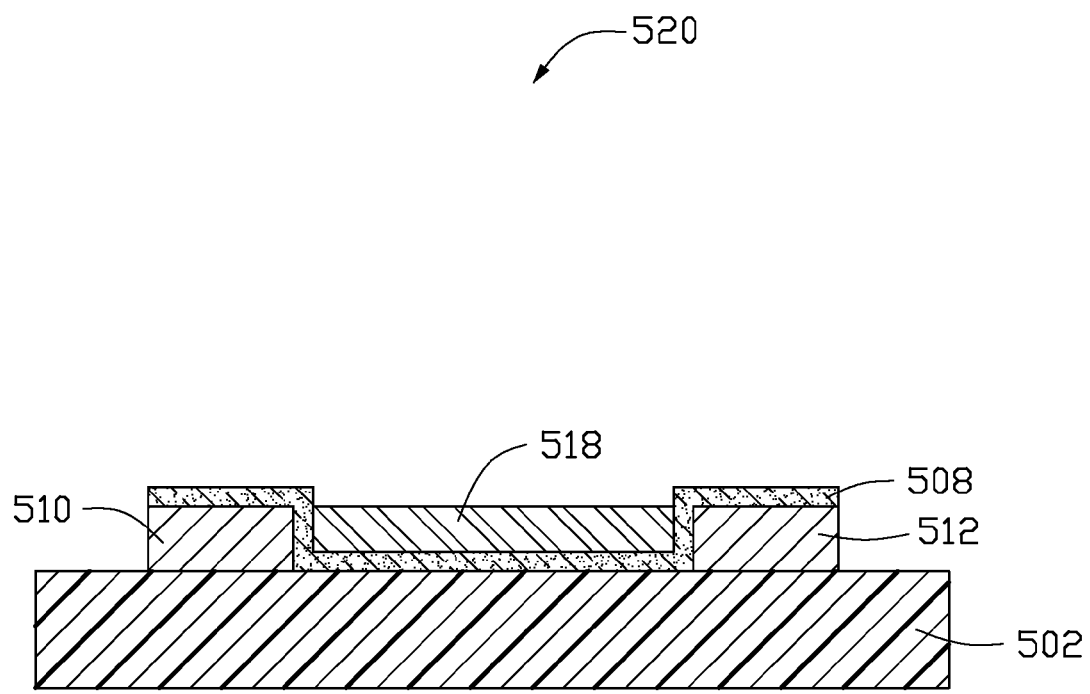
FIG. 8 is a schematic view of one embodiment of a thermochromatic device.

Referring to FIG. 8, a thermochromatic device 520 of one embodiment includes an insulating substrate 502, a color element 518, a heating element 508, a first electrode 510, and a second electrode 512. The thermochromatic device 520 is similar to the thermochromatic device 220 described above except that the heating element 508 is located between the insulating substrate 502 and the color element 518 and extends to side surfaces of the color element 518. In one embodiment, the first electrode 510 and the second electrode 512 are located on a surface of the insulating substrate 502 and spaced from each other. The color element 518 is located between the first electrode 510 and the second electrode 512. The heating element 508 is located between the insulating substrate 502 and the color element 518 and extends to a top surface of the electrodes 510 and 512 through side surfaces of the electrodes 510 and 512. The heating element 508 can also extend to a top surface of the color element 518 to package the color element 518. The heating element 508 is a single drawn carbon nanotube film, which is transparent and free standing. Because the heating element 508 and the color element 518 have a larger contacting surface, the color element 518 can be heated effectively. Therefore, the thermochromatic device 520 has an improved response speed.

Thermochromatic device 520 can be made by the following steps:

(g) forming a first electrode 510 and a second electrode 512 on a surface of the insulating substrate 502;

(h) laying a single drawn carbon nanotube film on a surface of the electrodes 510 and 512 to cover the first electrode 510 and the second electrode 512;

(i) pressing the carbon nanotube film between the first electrode 510 and the second electrode 512 so that the carbon nanotube film attaches on the surface of the insulating substrate 502 and two opposite surfaces of the electrodes 510 and 512; and (j) depositing a layer of germanium-selenium compound between the first electrode 510 and the second electrode 512 as a color element 518.

Figure 9:
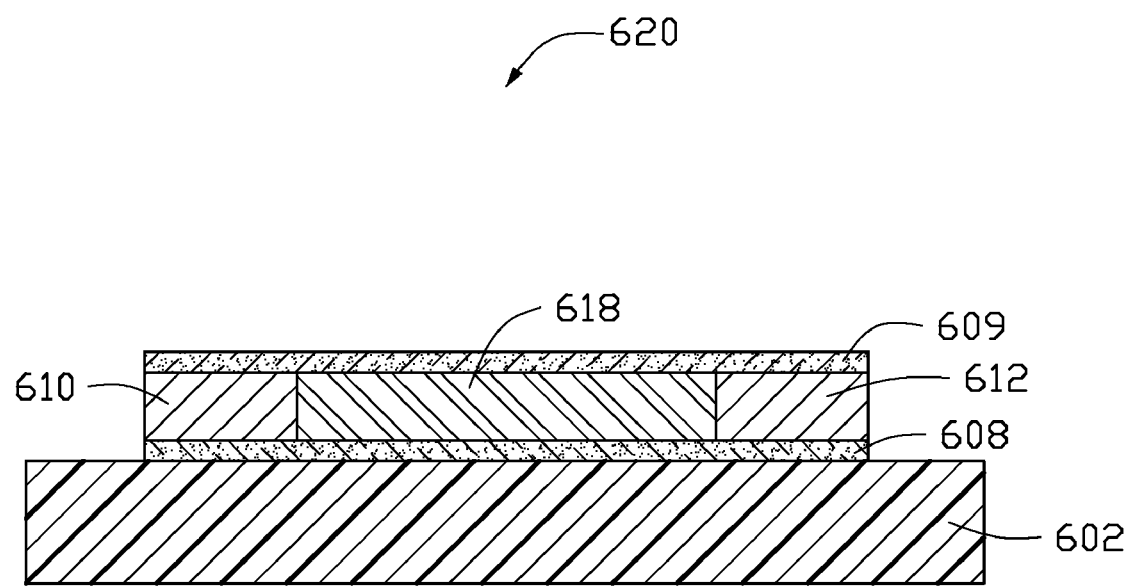
FIG. 9 is a schematic view of one embodiment of a thermochromatic device.

Referring to FIG. 9, a thermochromatic device 620 of one embodiment includes an insulating substrate 602, a color element 618, a first heating element 608, a first second heating element 609, a first electrode 610 and a second electrode 612. The thermochromatic device 620 is similar to the thermochromatic device 220 described above except that the thermochromatic device 620 includes two heating elements 608 and 609. In one embodiment, the first heating element 608 is located on a surface of the insulating substrate 602. The first electrode 610 and the second electrode 612 are located on a surface of the first heating element 608 and spaced from each other. The color element 618 is located on the surface of the first heating element 608 and between the first electrode 610 and the second electrode 612. The second heating element 609 is located on a surface of the color element 618 and covers the first electrode 610 and the second electrode 612. The heating elements 608 and 609 are single drawn carbon nanotube film, which is transparent and free standing. Because the thermochromatic device 620 has two heating elements 608 and 609, the color element 618 can be heated effectively. Therefore, the thermochromatic device 620 has an improved response speed.

Thermochromatic device 620 can be made by the following steps:

(k) laying a first drawn carbon nanotube film on a surface of the insulating substrate 602 as a first heating elements 608;

(l) forming a first electrode 610 and a second electrode 612 on a surface of the first heating elements 608;

(m) depositing a layer of germanium-selenium compound between the first electrode 610 and the second electrode 612 as a color element 618; and (n) laying a second drawn carbon nanotube film on a surface of the color element 618 to cover the first electrode 610 and the second electrode 612.

Figure 10:
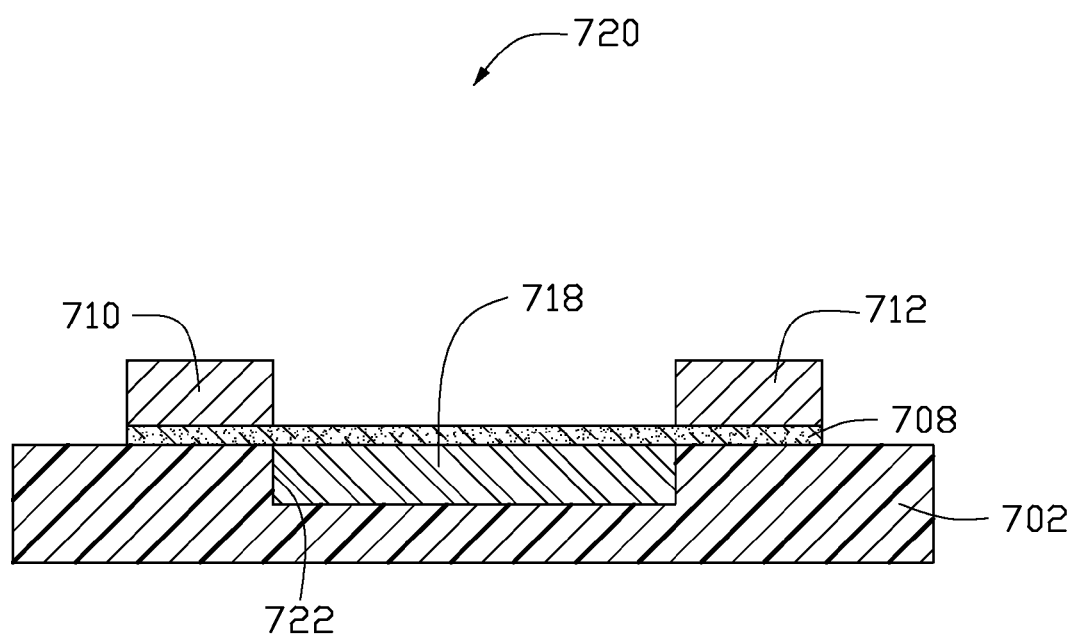
FIG. 10 is a schematic view of one embodiment of a thermochromatic device.

Referring to FIG. 10, a thermochromatic device 720 of one embodiment includes an insulating substrate 702, a color element 718, a heating element 708, a first electrode 710, and a second electrode 712. The thermochromatic device 720 is similar with the thermochromatic device 220 described above except that a recess 722 is formed on a surface of the insulating substrate 702, and the color element 718 is located in the recess 722. In one embodiment, the color element 718 is located in and fills the recess 722. The heating element 708 is located on a surface of the insulating substrate 702 and covers the recess 722. The first electrode 710 and the second electrode 712 are located on a surface of the heating element 708 and spaced from each other. The heating element 708 is a single drawn carbon nanotube film which is a transparent and free standing film. The color element 718 can remain in a shape substantially the same as the shape of the recess 722 during heating process.

Thermochromatic device 720 can be made by the following steps:

(o) forming a recess 722 on a surface of the insulating substrate 702;

(p) depositing a layer of germanium-selenium compound in the recess 722 as a color element 718;

(q) laying a single drawn carbon nanotube film on a surface of the insulating substrate 702 as the heating element 708, wherein the heating element 708 covers the recess 722; and (r) forming a first electrode 710 and a second electrode 712 on a surface of the heating elements 708.

The disclosure further provides a thermochromatic display apparatus using the thermochromatic device described in above embodiments. The thermochromatic display apparatus includes a plurality of thermochromatic devices arranged to form a pixel matrix, a driving circuit capable of controlling the plurality of thermochromatic devices, and a number of lead wires configured to electrically connect the driving circuit and the number of thermochromatic devices. The number of thermochromatic devices can use one common insulating substrate and be controlled by an addressing circuit. The thermochromatic display apparatus using the thermochromatic device 220 of the first embodiment is given below to illuminate the thermochromatic display apparatus of the disclosure.

Figure 11:
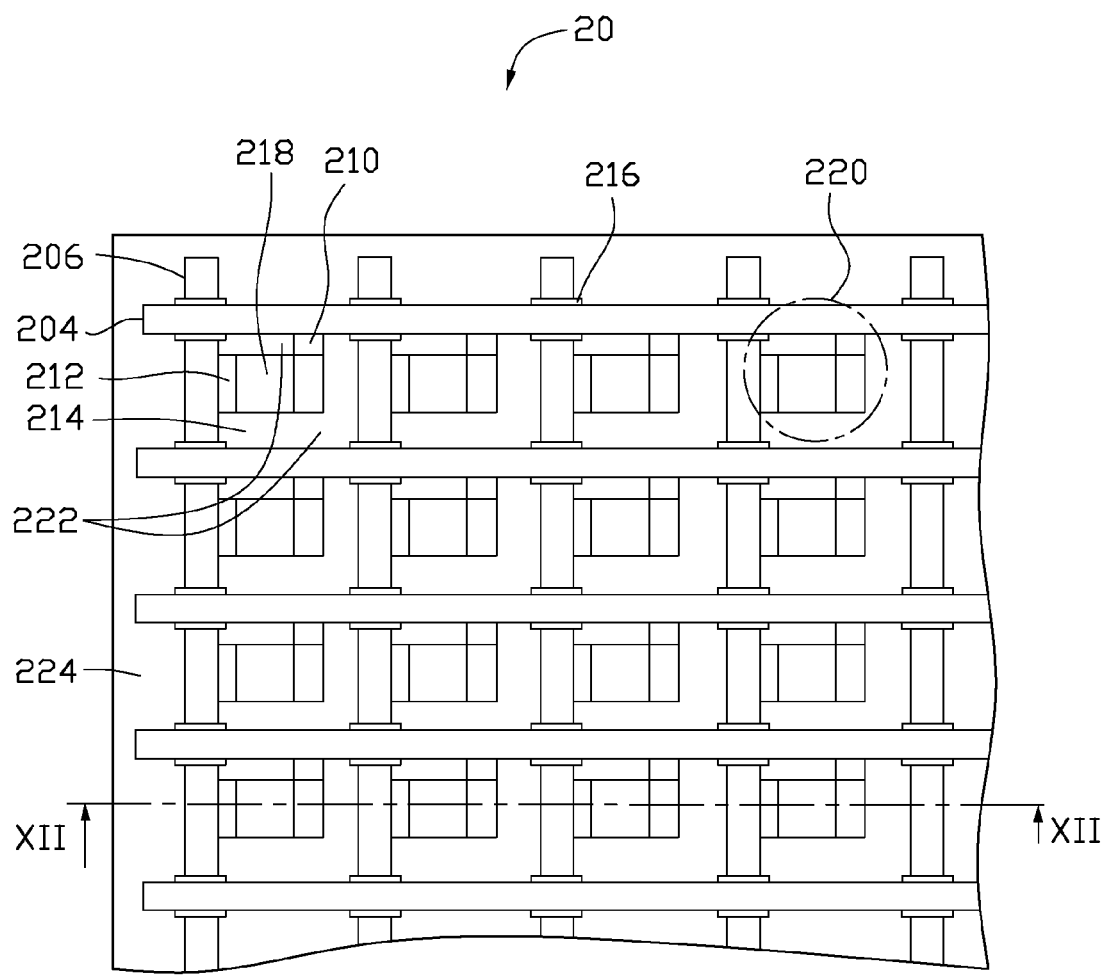
FIG. 11 is a schematic view of a thermochromatic display apparatus using the thermochromatic device of FIG. 1.
Figure 12:
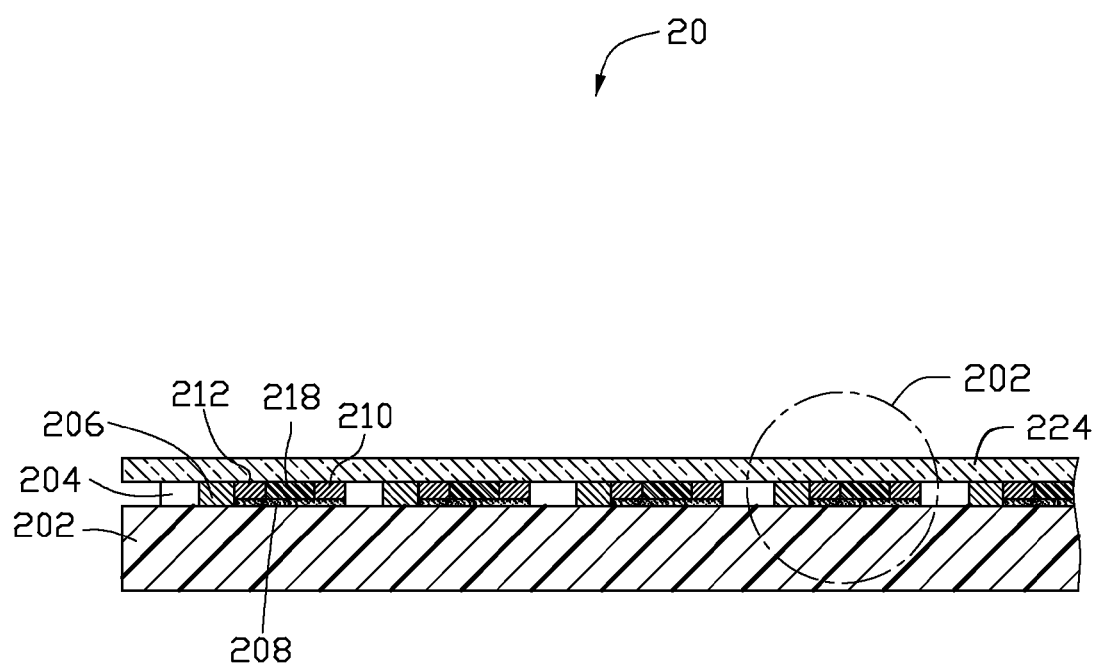
FIG. 12 is a schematic, cross-sectional view, along a line XII-XII of FIG. 11.

Referring to FIGS. 11 and 12, a thermochromatic display apparatus 20 includes an insulating substrate 202, a number of substantially parallel first electrode down-leads 204, a number of substantially parallel second electrode down-leads 206, and a number of thermochromatic devices 220. The number of first and second electrode down-leads 204, 206 are located on the insulating substrate 202. The first electrode down-leads 204 are generally set at an angle to the second electrode down-leads 206 to form a grid. A cell 214 is defined by each two substantially adjacent first electrode down-leads 204 and each two substantially adjacent second electrode down-leads 206 of the grid. One of the thermochromatic devices 220 is located in each cell 214. Each thermochromatic device 220 corresponds to a pixel of the thermochromatic display apparatus 20.

The insulating substrate 202 is configured for supporting the first electrode down-leads 204, the second electrode down-leads 206, and the thermochromatic devices 220. The shape, size, and thickness of the insulating substrate 202 can be chosen according to need. In one embodiment, the insulating substrate 202 is a square PET substrate with a thickness of 1 millimeter and an edge length of 48 millimeters. The number of thermochromatic devices 220 uses a common insulating substrate 202.

The first electrode down-leads 204 are located equidistantly apart. A distance between adjacent two first electrode down-leads 204 can range from about 50 micrometers to about 2 centimeters. The second electrode down-leads 206 are located equidistantly apart. A distance between adjacent two second electrode down-leads 206 can range from about 50 micrometers to about 2 centimeters. A suitable orientation of the first electrode down-leads 204 and the second electrode down-leads 206 are that they be set at an angle with respect to each other. The angle can range from about 10 degrees to about 90 degrees. In one embodiment, the angle is 90 degrees, and the cell 214 is a square area.

The first electrode down-leads 204 and the second electrode down-leads 206 are made of conductive material such as metal or conductive slurry. In one embodiment, the first electrode down-leads 204 and the second electrode down-leads 206 are formed by applying conductive slurry on the insulating substrate 202 using screen printing process. The conductive slurry composed of metal powder, glass powder, and binder. The metal powder can be silver powder, the glass powder having low melting point, and the binder can be terpineol or ethyl cellulose (EC). The conductive slurry can include about 50% to about 90% (by weight) of the metal powder, about 2% to about 10% (by weight) of the glass powder, and about 8% to about 40% (by weight) of the binder. In one embodiment, each of the first electrode down-leads 204 and the second electrode down-leads 206 is formed with a width in a range from about 30 micrometers to about 100 micrometers and with a thickness in a range from about 10 micrometers to about 50 micrometers. However, it is noted that dimensions of each of the first electrode down-leads 204 and the second electrode down-leads 206 can vary corresponding to dimension of each cell 214.

The first electrodes 210 of the thermochromatic devices 220 arranged in a row of the cells 214 can be electrically connected to the first electrode down-lead 204. The second electrodes 212 of the thermochromatic devices 220 arranged in a column of the cells 214 can be electrically connected to the second electrode down-lead 206.

Each of the first electrodes 210 can have a length in a range from about 20 micrometers to about 15 millimeters, a width in a range from about 30 micrometers to 10 millimeters and a thickness in a range from about 10 micrometers to about 500 micrometers. Each of the second electrodes 212 has a length in a range from about 20 micrometers to about 15 millimeters, a width in a range from about 30 micrometers to about 10 millimeters and a thickness in a range from about 10 micrometers to about 500 micrometers. In one embodiment, the first electrode 210 has a length in a range from about 100 micrometers to about 700 micrometers, a width in a range from about 50 micrometers to about 500 micrometers and a thickness in a range from about 20 micrometers to about 100 micrometers. The second electrode 212 has a length in a range from about 100 micrometers to about 700 micrometers, a width in a range from about 50 micrometers to about 500 micrometers and a thickness in a range from about 20 micrometers to about 100 micrometers.

The first electrodes 210 and the second electrode 212 can be made of metal or conductive slurry. In one embodiment, the first electrode 210 and the second electrode 212 are formed by screen printing the conductive slurry on the insulating substrate 202. As mentioned above, the conductive slurry forming the first electrode 210 and the second electrode 212 is the same as the electrode down-leads 204, 206.

Furthermore, the thermochromatic display apparatus 20 can include a plurality of insulators 216 sandwiched between the first electrode down-leads 204 and the second electrode down-leads 206 to avoid short-circuiting. The insulators 216 are located at every intersection of the first electrode down-leads 204 and the second electrode down-leads 206 for providing electrical insulation therebetween. In one embodiment, the insulator 216 is a dielectric insulator.

In one embodiment, 16×16 (16 rows, and 16 thermochromatic devices 220 on each row) thermochromatic devices 220 are arranged on a square PET insulating substrate 202 with an edge length of 48 millimeters. Each heating element 208 is a single drawn carbon nanotube film with a length of 300 micrometers and a width of 100 micrometers. The single drawn carbon nanotube film is fixed on the surface of the insulating substrate 202 with an adhesive. The ends of the heating element 208 are located between the insulating substrate 202 and the electrodes 210 and 212. The carbon nanotubes of the heating element 208 extend from the first electrode 210 to the second electrode 212.

Furthermore, the thermochromatic display apparatus 20 can include a heat-resistant material 222 located around each thermochromatic device 220. The heat-resistant material 222 can be located in a space between the thermochromatic device 220 and the electrode down-leads 204, 206 in the cell 214. The thermochromatic devices 220 in adjacent cells 214 are heat insulated and will not interfere with each other. The heat-resistant material 222 can be aluminum oxide ($Al_2O_3$) or organic material such as PET, PC, PE, or PI. In one embodiment, the heat-resistant material 222 is PET with a thickness same as the thickness of the electrode down-leads 204, 206. The heat-resistant material 222 can be formed by printing, chemical vapor deposition (CVD) or physical vapor deposition (PVD).

Furthermore, the thermochromatic display apparatus 20 can include a protecting layer 224 located on the insulating substrate 202 to cover all the electrode down-leads 204, 206, and the thermochromatic devices 220. The protecting layer 224 is an insulating transparent layer that can be made of aluminum oxide ($Al_2O_3$), silicon dioxide ($SiO_2$), or organic material such as PET, PC, PE, or PI. The thickness of the protecting layer 224 can be selected according to need. In one embodiment, the protecting layer 224 is a PET sheet with a thickness in a range from about 0.5 millimeter to about 2 millimeters. The protecting layer 224 can prevent the thermochromatic display apparatus 20 from being damaged and polluted.

In use, the thermochromatic display apparatus 20 can include a driving circuit (not shown) to drive the thermochromatic display apparatus 20 to display. The driving circuit can control the thermochromatic devices 220 through the electrode down-leads 204, 206 to display a dynamic image. The thermochromatic display apparatus 20 can be used in a field of advertisement billboard, newspaper, or electronic book.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A thermochromatic device, comprising:
an insulating substrate having a top surface;
a color element located on the top surface of the insulating substrate and comprising a color-changeable material, wherein a phase of the color-changeable material is changeable between a crystalline state and an amorphous state, a temperature phase change of the color-changeable material is above 40° C., and a first reflectivity of the color-changeable material in the crystalline state and a second reflectivity of the color-changeable material in the amorphous state are different;
a first heating element configured to supply a heat pulse to heat the color element, wherein the first heating element comprises a carbon nanotube structure; and
a first electrode and a second electrode electrically connected to the first heating element.

2. The thermochromatic device of claim 1, wherein the color element and the first heating element are stacked on each other.

3. The thermochromatic device of claim 2, wherein the first heating element is located between the insulating substrate and the color element.

4. The thermochromatic device of claim 3, further comprising a second heating element located on the color element, wherein the first and second heating elements are parallel to each other to sandwich the color element.

5. The thermochromatic device of claim 2, wherein the first heating element is located on the color element.

6. The thermochromatic device of claim 1, wherein the first heating element is spaced from the color element and is in contact with the first electrode and the second electrode.

7. The thermochromatic device of claim 1, wherein the insulating substrate has a recess defined on the top surface, and the color element is located in the recess.

8. The thermochromatic device of claim 1, wherein the temperature phase change is below 600° C.

9. The thermochromatic device of claim 1, wherein the color-changeable material comprises a chalcogenide compound; the chalcogenide compound is selected from the group consisting of sulfur-based compound, tellurium-based compound, selenium-based compound, tellurium-selenium-based compound, and combinations thereof.

10. The thermochromatic device of claim 9, wherein the color-changeable material is selected from the group consisting of germanium-sulfur, arsenic-sulfur, indium-sulfur, germanium-tellurium, arsenic-tellurium, antimony-tellurium, indium-tellurium, germanium-selenium, arsenic-selenium, antimony-selenium, indium-selenium, and combinations thereof.

11. The thermochromatic device of claim 9, wherein the color-changeable material further comprises additive; the additive is selected from the group consisting of copper, silver, gold, palladium, nickel, cobalt, and combination thereof.

12. The thermochromatic device of claim 1, wherein the carbon nanotube structure comprises at least one carbon nanotube film.

13. The thermochromatic device of claim 12, wherein a heat capacity per unit area of the at least one carbon nanotube film is less than $2 \times 10^{-4}$ J/$m^2$·K.

14. The thermochromatic device of claim 12, wherein the at least one carbon nanotube film comprises a plurality of carbon nanotubes substantially oriented along a same direction that extends from the first electrode to the second electrode.

15. The thermochromatic device of claim 14, wherein the plurality of carbon nanotubes of the at least one carbon nanotube film are joined end-to-end by Van der Waals attractive force therebetween.

16. The thermochromatic device of claim 1, wherein the carbon nanotube structure comprises at least one carbon nanotube wire; the at least one carbon nanotube wire is twisted carbon nanotube wire or untwisted carbon nanotube wire.

17. An thermochromatic display apparatus, comprising:
an insulating substrate;

a plurality of first electrode down-leads located on the insulating substrate, wherein the plurality of first electrode down-leads are substantially parallel;

a plurality of second electrode down-leads located on the insulating substrate, wherein the plurality of second electrode down-leads are substantially parallel, and the plurality of first electrode down-leads are set an angle relative to the plurality of second electrode down-leads to define a grid, and each two adjacent first electrode down-leads and each two adjacent second electrode down-leads of the grid define a plurality of cells; and a plurality of thermochromatic devices, wherein each of the plurality of thermochromatic devices is located in each of the plurality of cells, and each of the plurality of thermochromatic devices comprising:

a color element located on the top surface of the insulating substrate and comprising a color-changeable material, wherein a phase of the color-changeable material is changeable between a crystalline state and an amorphous state, a temperature phase change of the color-changeable material is above 40° C. and a first reflectivity of the color-changeable material in the crystalline state and a second reflectivity of the color-changeable material in the amorphous state are different;

a heating element configured to supply a heat pulse to heat the color element, wherein the heating element comprises a carbon nanotube structure; and a first electrode and a second electrode electrically connected to the heating element.

18. The thermochromatic display apparatus of claim 17, further comprising a heat-resistant material located around each of the plurality of thermochromatic devices.

19. The thermochromatic display apparatus of claim 17, further comprising a protecting layer located on the insulating substrate to cover the plurality of first electrode down-leads, the plurality of second electrode down-leads, and the plurality of thermochromatic devices.

20. An thermochromatic display apparatus, comprising:

a plurality of thermochromatic devices arranged to form a pixel matrix, and each of the plurality of thermochromatic devices comprises:

an insulating substrate having a top surface;

a color element located on the top surface of the insulating substrate and comprising a color-changeable material, wherein a phase of the color-changeable material is changeable between a crystalline state and an amorphous state; a temperature phase change of the color-changeable material is above 40° C., and a first reflectivity of the color-changeable material in the crystalline state and a second reflectivity of the color-changeable material in the amorphous state are different;

a heating element configured to supply a heat pulse to heat the color element, wherein the heating element comprises a carbon nanotube structure; and a first electrode and a second electrode electrically connected to the heating element;

a driving circuit capable of controlling the plurality of thermochromatic devices; and a plurality of lead wires configured to electrically connect the driving circuit and the plurality of thermochromatic devices.

* * * * *